United States Patent
Li et al.

(10) Patent No.: US 10,295,876 B2
(45) Date of Patent: May 21, 2019

(54) ARRAY SUBSTRATE AND METHOD FOR MANUFACTURING THE SAME, DISPLAY APPARATUS

(71) Applicant: BOE Technology Group Co., Ltd., Beijing (CN)

(72) Inventors: Pan Li, Beijing (CN); Hongfei Cheng, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 15/709,990

(22) Filed: Sep. 20, 2017

(65) Prior Publication Data
US 2018/0113365 A1 Apr. 26, 2018

(30) Foreign Application Priority Data
Oct. 24, 2016 (CN) ...................... 2016 2 1155992 U

(51) Int. Cl.
*G02F 1/1362* (2006.01)
*G02F 1/1343* (2006.01)
*G02F 1/1368* (2006.01)

(52) U.S. Cl.
CPC ...... *G02F 1/136286* (2013.01); *G02F 1/1362* (2013.01); *G02F 1/13439* (2013.01); *G02F 1/134309* (2013.01); *G02F 1/1368* (2013.01); *G02F 2001/134318* (2013.01); *G02F 2001/136218* (2013.01); *G02F 2001/136295* (2013.01); *G02F 2201/123* (2013.01)

(58) Field of Classification Search
CPC ............. G02F 1/136286; G02F 1/1362; G02F 1/134309; G02F 1/13439; G02F 2001/136218; G02F 1/1368; G02F 2001/134318; G02F 2201/123; G02F 2001/136295
See application file for complete search history.

(56) References Cited

U.S. PATENT DOCUMENTS

2006/0061722 A1* 3/2006 Jun .................... G02F 1/133707
349/139

* cited by examiner

*Primary Examiner* — Kyoung Lee
(74) *Attorney, Agent, or Firm* — Nath, Goldberg & Meyer; Joshua B. Goldberg; Daniel Bissing

(57) ABSTRACT

The present disclosure provides an array substrate and a method for manufacturing the same, and a display apparatus. The array substrate comprises a shielding electrode driven independently, and the shielding electrode covers at least one gate line and/or at least one data line. The shielding electrode can isolate a signal of the at least one gate line and/or the at least one data line, so that the signal of the at least one gate line and/or the at least one data line is prevented from interfering with normal deflections of liquid crystal molecules of a liquid crystal display. Moreover, since the shielding electrode is driven independently, the shielding electrode will not affect a voltage of a common electrode of the liquid crystal display.

19 Claims, 4 Drawing Sheets

ARRAY SUBSTRATE AND METHOD FOR MANUFACTURING THE SAME, DISPLAY APPARATUS

CROSS-REFERENCE TO RELATED APPLICATION

The present disclosure claims priority of Chinese Patent Application No. 201621155992.6 filed on Oct. 24, 2016, the disclosure of which is hereby incorporated herein by reference in its entirety.

TECHNICAL FIELD

The present disclosure relates to the field of liquid crystal display technology, and particularly, to an array substrate and a method for manufacturing the same, and a display apparatus.

BACKGROUND

Currently, a thin film transistor liquid crystal display (TFT-LCD) is dominant in the field of display due to its advantages such as small volume, low power consumption, radiation-free, and low manufacturing cost. Generally, a liquid crystal display comprises an array substrate, a color filter substrate, and a liquid crystal layer provided between the array substrate and the color filter substrate. The array substrate comprises a gate line and a data line, signals of which may interfere with normal deflections of liquid crystal molecules in the liquid crystal layer, resulting in a poor quality of an image displayed by the liquid crystal display.

SUMMARY

An embodiment of the present disclosure provides an array substrate comprising a base, and a plurality of gate lines and a plurality of data lines formed on the base, the array substrate further comprises at least one shielding electrode driven independently, and the at least one shielding electrode covers at least one of at least one of the gate lines and at least one of the data lines.

Optionally, the gate lines and the data lines intersect to define a plurality of display regions, and the at least one shielding electrode includes more than one shielding electrodes, the shielding electrodes cover more than one of the gate lines and more than one of the data lines, the shielding electrodes covering more than one of the gate lines and the shielding electrodes covering more than one of the data lines intersect to define at least one shielding region, and the at least one shielding region covers at least one of the display regions.

Optionally, the shielding electrodes covering more than one of the gate lines are arranged at equal intervals, and the shielding electrodes covering more than one of the data lines are arranged at equal intervals.

Optionally, the array substrate further comprises a first driving line for driving the shielding electrodes, and the first driving line is connected to the shielding electrodes covering more than one of the gate lines and the shielding electrodes covering more than one of the data lines.

Optionally, the array substrate further comprises a plurality of second driving lines, and each of the second driving lines is connected to at least one group of the shielding electrodes.

Optionally, driving voltages of the second driving lines are different from each other.

Optionally, a first insulating layer is provided between the at least one shielding electrode and the gate lines or the data lines.

Optionally, the array substrate further comprises a common electrode covering the gate lines and the data lines, the at least one shielding electrode is provided on a side of the common electrode proximal to the gate lines and the data lines.

Optionally, a second insulating layer is provided between the at least one shielding layer and the common electrode.

Optionally, the array substrate further comprises a pixel electrode, the at least one shielding electrode and the pixel electrode are formed of a same material in a same layer.

Alternatively, the array substrate may comprise common electrodes provided in the display regions, the shielding electrodes and the common electrodes are formed of a same material in a same layer.

Optionally, the shielding electrode has a width equal to or larger than a width of the gate line, and/or, the shielding electrode has a width equal to or larger than a width of the data line.

Optionally, the shielding electrode is formed of a transparent conductive material.

An embodiment of the present disclosure further provides a display apparatus comprising a color filter substrate and an array substrate described as above.

Optionally, the color filter substrate comprises a common electrode, an orthographic projection of the common electrode on the array substrate at least partially overlaps with an orthographic projection of the shielding electrode on the array substrate.

Optionally, the common electrode and the shielding electrode are driven by a same driving voltage.

An embodiment of the present disclosure further provides a method for manufacturing the array substrate described as above, the method comprising steps of:

forming a plurality of gate lines and a plurality of data lines on a base;

forming at least one shielding electrode covering at least one of at least one of the gate lines and at least one of the data lines, the at least one shielding electrode being driven independently.

Optionally, the method further comprising a step of: forming a first insulating layer between the at least one shielding electrode and the gate lines or the data lines.

Optionally, the method further comprising a step of: forming a common electrode covering the gate lines and the data lines, the at least one shielding electrode being provided on a side of the common electrode proximal to the gate lines and the data lines.

Optionally, the method further comprising a step of: forming a second insulating layer between the at least one shielding electrode and the common electrode.

DESCRIPTION OF EMBODIMENTS

In order to make a person skilled in the art understand technical solutions of the present disclosure better, the array substrate and the method for manufacturing the same, and the display apparatus provided by the present disclosure will be described in detail below in conjunction with the accompanying drawings.

Generally, a liquid crystal display comprises an array substrate, a color filter substrate, and a liquid crystal layer provided between the array substrate and the color filter substrate.

Figure 1:
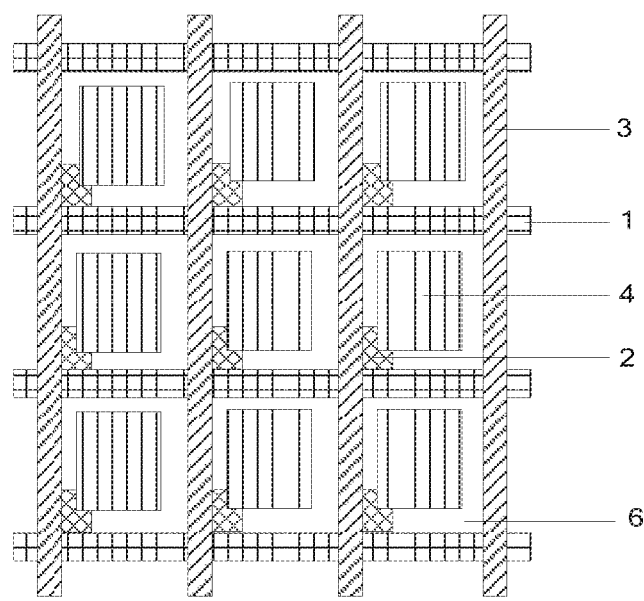
FIG. 1 shows a top view of a structure of an array substrate.

FIG. 1 shows a top view of a structure of an array substrate. As shown in FIG. 1, the array substrate comprises gate lines 1, data lines 3, thin film transistors 2 and pixel electrodes 4. The gate lines 1 and the data lines 3 intersect to define display regions 6, and the thin film transistors 2 and the pixel electrodes 4 are provided in the display regions 6.

According to a display mode of the liquid crystal display, the array substrate may further comprise a common electrode; alternatively, the common electrode may be provided in the color filter substrate.

By providing signals to the gate lines 1 and the data lines 3 of the array substrate, electrical fields between the common electrode and the pixel electrodes 4 may be controlled through the thin film transistors 2, so that liquid crystal molecules in the liquid crystal layer deflect, and different polarized light rays are emitted from the display regions 6 respectively to achieve a display.

However, during displaying, signals of the gate lines 1 and the data lines 3 generally interfere with normal deflections of the liquid crystal molecules so that an emission of polarized light rays of the display regions 6 is affected, resulting in a poor quality of an image displayed by the liquid crystal display.

For example, the common electrode may be provided in the array substrate and covers the gate lines 1 and the data lines 3 to reduce an interference of signals of the gate lines 1 and the data lines 3 to the liquid crystal molecules; however, signals of the gate lines 1 and the data lines 3 also interfere with a voltage of the common electrode, so that electrical fields between the pixel electrodes 4 and the common electrode are affected, resulting in an non-uniform display and a flicker of the image displayed by the liquid crystal display.

Figure 2:
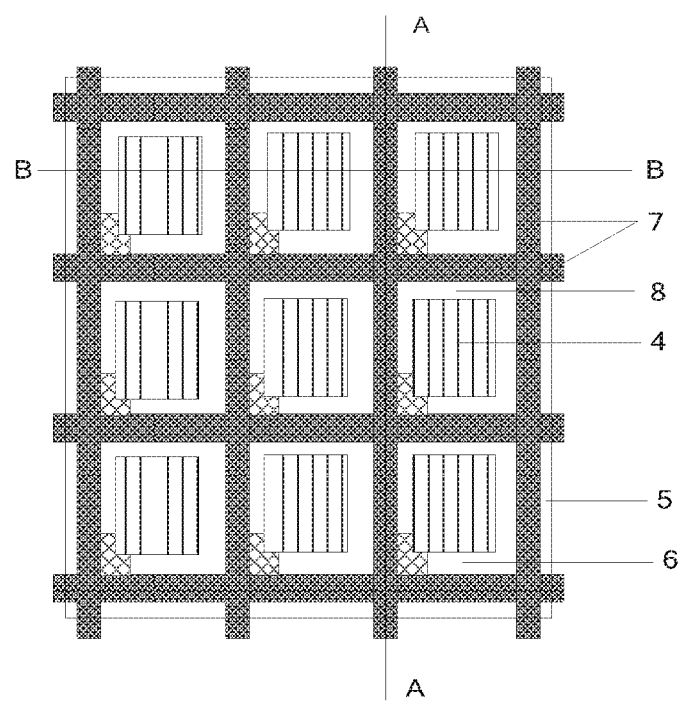
FIG. 2 shows a top view of a structure of an improved array substrate in a first embodiment of the present disclosure.
Figure 3:
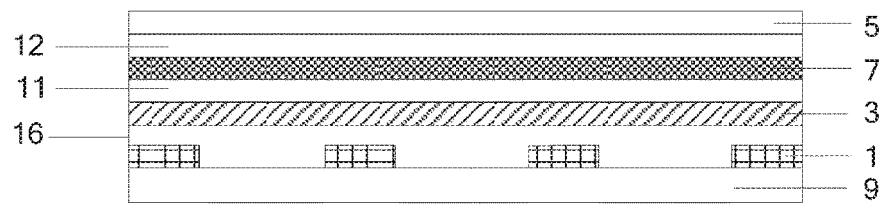
FIG. 3 shows a structural cross sectional view taken along line A-A of the improved array substrate in the first embodiment of the present disclosure.

An embodiment of the present disclosure provides an improved array substrate. As shown in FIGS. 2 and 3, the array substrate comprises a base 9, and a plurality of gate lines 1 and a plurality of data lines 3 formed on the base 9. The array substrate further comprises at least one shielding electrode 7 driven independently, and the at least one shielding electrode 7 covers at least one of at least one of the gate lines 1 and at least one of the data lines 3.

In the array substrate provided by the embodiment of the present disclosure, the at least one shielding electrode 7 is provided on the base 9 to cover at least one of the gate lines 1 and/or at least one of the data lines 3 so as to isolate a signal of the at least one of the gate lines 1 and/or the at least one of the data lines 3, and thus the signal of the at least one of the gate lines 1 and/or the at least one of the data lines 3 is prevented from interfering with the normal deflections of the liquid crystal molecules, thereby improving the quality of the image displayed by the liquid crystal display.

Moreover, the shielding electrode 7 is driven independently. For example, the shielding electrode 7 and the common electrode of the liquid crystal display are driven separately, and thus the shielding electrode 7 will not interfere with the voltage of the common electrode of the liquid crystal display, thereby avoiding the non-uniform display and the flicker of the image displayed by the liquid crystal display.

For example, each shielding electrode 7 may be of a strip-like shape to cover one of the gate lines 1 or one of the data lines 3, however, the present disclosure is not limited thereto, an ordinary skilled person in the art can determine the shape of each shielding electrode 7 as required.

Specific embodiments are described in detail below.

First Embodiment

As shown in FIGS. 2 and 3, the array substrate of the present embodiment comprises a common electrode 5 covering the gate lines 1 and the data lines 3, and the shielding electrode 7 is provided on a side of the common electrode 5 proximal to the gate lines 1 and the data lines 3.

Specifically, as shown in FIGS. 2 and 3, the array substrate comprises the base 9, the gate lines 1 and the data lines 3 provided on the base 9, the common electrode 5 covering the gate lines 1 and the data lines 3, and the shielding electrode 7 driven independently. The shielding electrode 7 covers at least one of the gate lines 1 and/or at least one of the data lines 3, and the shielding electrode 7 is provided on the side of the common electrode proximal to the gate lines 1 and the data lines 3.

Correspondingly, in the manufacturing process of the array substrate of the present embodiment, the gate lines 1 and the data lines 3 are first formed on the base 9; the shielding electrode 7 driven independently is then formed on the gate lines 1 and the data lines 3, the shielding electrode 7 covering at least one of the gate lines 1 and/or at least one of the data lines 3; and thereafter, the common electrode 5 is formed on the shielding electrode 7, so that a structure, in which the shielding electrode 7 is provided between the common electrode 5, and the gate lines 1 and the data lines 3, is formed.

In the present embodiment, the shielding electrode 7 is closer to the gate lines 1 and the data lines 3 than the common electrode 5, that is, the shielding electrode 7 is provided between the common electrode 5, and the gate lines 1 and the data lines 3, so that the shielding electrode 7 can isolate the signal of the at least one of the gate lines 1 and/or at least one of the data lines 3 covered by the shielding electrode 7, the signal of the gate lines 1 and/or at least one of the data lines 3 is prevented from interfering with the voltage of the common electrode 5, and the image is displayed more uniformly by the liquid crystal display.

It should be noted that, the gate lines 1 may be formed on the base 9 prior to the formation of the data lines 3, or the gate lines 1 may be formed on the base 9 after the formation of the data lines 3. As shown in FIG. 3, in the present embodiment, an example in which the gate lines 1 are formed on the base 9 prior to the formation of the data lines 3 is described. In order to avoid an electrical connection between the shielding electrode 7 and the data lines 3, a data line insulating layer 11 may be provided between the shielding electrode 7 and the data lines 3, and in order to avoid an electrical connection between the shielding electrode 7 and the common electrode 5, a shielding electrode insulating layer 12 may be provided between the shielding electrode 7 and the common electrode 5, and in order to avoid an electrical connection between the data lines 3 and the gate lines 1, a gate line insulating layer 16 may be provided between the data lines 3 and the gate lines 1.

Optionally, as shown in FIG. 2, the shielding electrode 7 has a width equal to or larger than a width of the gate line 1, and/or, the shielding electrode 7 has a width equal to or larger than a width of the data line 3. Specifically, the shielding electrode 7 covering the gate line 1 has a width equal to or larger than the width of the gate line 1, and the shielding electrode 7 covering the data line 3 has a width equal to or larger than the width of the data line 3, thus the shielding electrode 7 isolates the gate line 1 and the data line 3, signals of the gate lines 1 and the data lines 3 are prevented from interfering with the liquid crystal molecules and the voltage of the common electrode 5.

In the present embodiment, as shown in FIG. 2, the gate lines 1 and the data lines 3 define a plurality of display regions 6, the at least one shielding electrode 7 includes more than one shielding electrodes 7, the shielding electrodes 7 cover more than one of the gate lines 1 and more than one of the data lines 3, the shielding electrodes 7 covering more than one of the gate lines 1 and the shielding electrodes 7 covering more than one of the data lines 3 intersect to define at least one shielding region 8, and the at least one shielding region 8 covers at least one of the display regions 6. That is to say, the shielding electrodes 7 may cover the gate lines 1 and the data lines 3 simultaneously, the shielding electrodes 7 covering the gate lines 1 and the shielding electrodes 7 covering the data lines 3 intersect to form a net-like structure, and each mesh of the net-like structure is one shielding region 8. It should be noted that, a shape and a size of each mesh of the net-like structure depend on a distribution of the shielding electrodes 7 covering the gate lines and the data lines 3, one or more display regions 6 are provided between adjacent shielding electrodes 7 covering the gate lines 1, and one or more display regions 6 are provided between adjacent shielding electrodes 7 covering the data lines 3, thus, each mesh of the net-like structure may cover one of the display regions 6 or more than one of the display regions 6.

Optionally, the shielding electrodes 7 covering the gate lines 1 are arranged at equal intervals, and the shielding electrodes 7 covering the data lines 3 are arranged at equal intervals. In such way, shielding regions 8 are formed in a same size and a same shape. In the present embodiment, an example in which the shielding regions 8 have a same size and a same shape and each shielding region 8 covers one of the display regions 6 is described. For example, the shielding electrodes 7 cover all of the gate lines 1 and the data lines 3 so as to isolate them, signals of the gate lines 1 and the data lines 3 are effectively prevented from interfering with the liquid crystal molecules and the voltage of the common electrode 5.

A structure of the shielding electrodes 7 is described in detail below in conjunction with FIG. 4.

Figure 4:
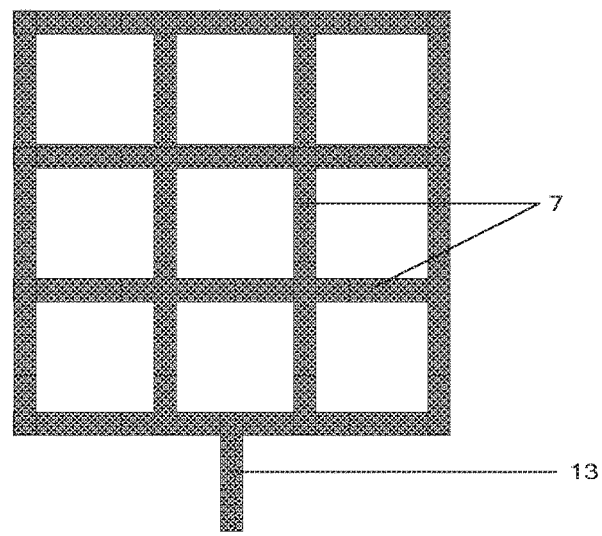
FIG. 4 shows a top view of a structure of a shielding electrode of the improved array substrate in the first embodiment of the present disclosure.

As shown in FIG. 4, the array substrate of the present embodiment may further comprise a first driving line 13 for driving the shielding electrodes 7 simultaneously, and the first driving line 13 is connected to the shielding electrodes 7 covering the gate lines 1 and the data lines 3. Specifically, the shielding electrodes 7 covering the gate lines 1 are connected with the shielding electrodes 7 covering the data lines 3, and the first driving line 13 is connected to the shielding electrodes 7 covering the gate lines 1 and/or the data lines 3, which are located nearby. When a driving voltage is applied to the first driving line 13, the shielding electrodes 7 covering the gate lines 1 and the data lines 3 are driven by a same voltage.

Optionally, the shielding electrodes 7 and the common electrode 5 are driven by a same voltage. In such way, the voltage of the shielding electrodes 7 will not affect the voltage of the common electrode 5, so that the image is displayed more uniformly by the liquid crystal display.

Another structure of the shielding electrodes 7 is described in detail below in conjunction with FIG. 5.

Figure 5:
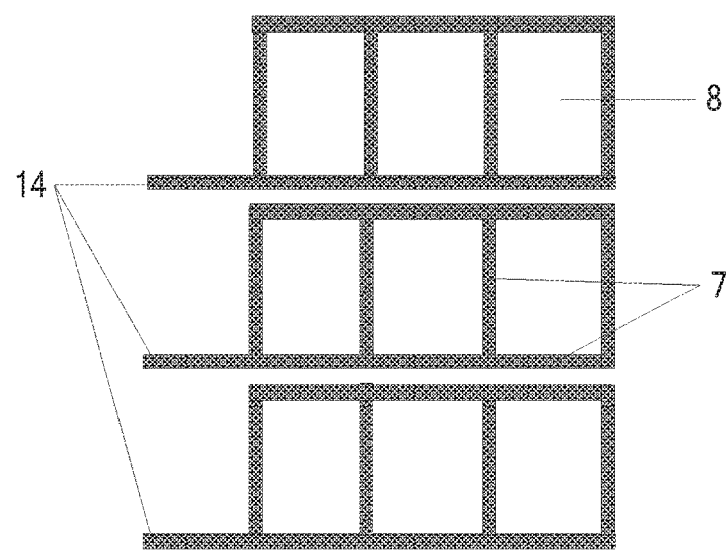
FIG. 5 shows a top view of a structure of another shielding electrode of the improved array substrate in the first embodiment of the present disclosure.

The shielding electrodes 7 shown in FIG. 5 are distinguished from the shielding electrodes 7 shown in FIG. 4 in that, a same driving voltage is applied to the shielding electrodes 7 shown in FIG. 4, that is, the shielding electrodes 7 of all the shielding regions 8 of the entire array substrate shown in FIG. 4 are driven simultaneously by a same driving voltage, in contrast, the shielding electrodes 7 shown in FIG. 5 are driven group by group, each group includes at least one of the shielding electrodes 7, for example, the shielding electrodes 7 of each row of the shielding regions 8 are driven by a single driving voltage.

As shown in FIG. 5, the array substrate of the present embodiment may comprise a plurality of second driving lines 14, and each of the second driving lines 14 is connected to at least one group of shielding electrodes 7, for example, is connected to the shielding electrodes 7 of at least one shielding region 8. Specifically, for example, the array substrate may comprise more than one groups of shielding regions, each group of shielding regions includes at least one shielding region 8, the shielding electrodes 7 of each group of shielding regions are independent of the shielding electrodes 7 of other groups of shielding regions, that is, the shielding electrodes 7 of each group of shielding regions are disconnected from the shielding electrodes 7 of other groups of shielding regions adjacent thereto. As shown in FIG. 5, an example in which each group of shielding regions includes three shielding regions 8 is described. Each of the second driving lines 14 is connected to the shielding electrodes 7 of one group of shielding regions, and when a driving voltage is applied to the second driving line 14, the shielding electrodes 7 connected to the second driving line 14 are driven.

Optionally, the second driving lines 14 are provided with different driving voltages, that is, the shielding electrodes 7 of each group of shielding regions are driven by a driving voltage different from that for driving the shielding electrodes of other groups of shielding regions. Specifically, the shielding electrodes 7 of each group of shielding regions are driven by a voltage from the second driving line 14 connected thereto, thus voltages of the common electrode 5 in different regions may be measured in advance, and then, a corresponding driving voltage is applied to the shielding electrodes 7 of each region in accordance with the voltage of the common electrode 5 in the region. In such way, the voltage of the common electrode 5 may be adjusted by the voltage of the shielding electrodes 7 in the corresponding region, such that voltages of the common electrode 5 in different regions are more uniform, the display effect of the image displayed by the liquid crystal display is improved.

Figure 6:
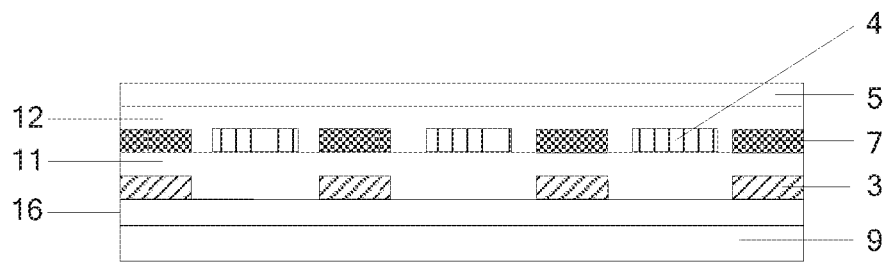
FIG. 6 shows a structural cross sectional view taken along line B-B of the improved array substrate in the first embodiment of the present disclosure.

Referring to FIGS. 2 and 6, the array substrate of the present embodiment further comprises pixel electrodes 4, the shielding electrodes 7 and the pixel electrodes 4 are formed of a same material in a same layer. Optionally, the shielding electrodes 7 are formed of a transparent conductive material.

Correspondingly, in the manufacturing process of the array substrate of the present embodiment, the gate lines 1 and the data lines 3 are first formed on the base 9; the shielding electrodes 7 and the pixel electrodes 4 are then simultaneously formed on the gate lines 1 and the data lines 3, i.e., the shielding electrodes 7 and the pixel electrodes 4 are formed by a single patterning process; and thereafter, the common electrode 5 is formed on the shielding electrodes 7 and the pixel electrodes 4. In such way, the shielding electrodes 7 are formed without increasing steps of the process, only the pattern to be formed by the patterning process is required to be changed, the process is simple.

Second Embodiment

Figure 7:
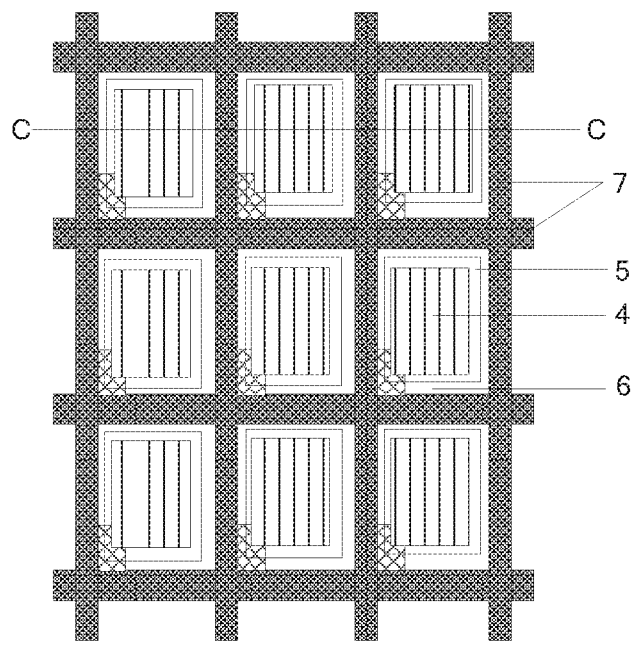
FIG. 7 shows a top view of a structure of an improved array substrate in a second embodiment of the present disclosure.
Figure 8:
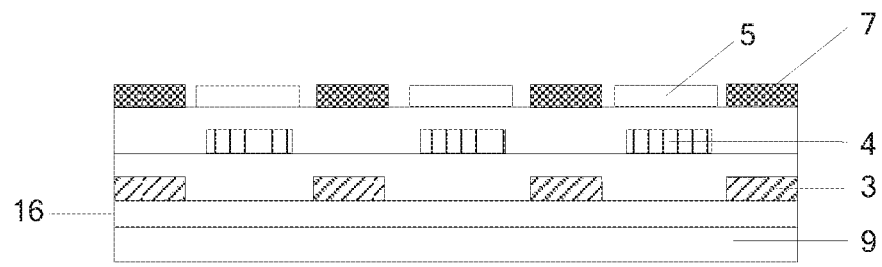
FIG. 8 shows a structural cross sectional view taken along line C-C of the improved array substrate in the second embodiment of the present disclosure.

The structure and the driving mode of the shielding electrodes in the array substrate of the present embodiment are the same as those in the first embodiment, referring to FIGS. 7 and 8, the present embodiment is distinguished from the first embodiment in that, the common electrode 5 of the first embodiment covers the entire array substrate to cover the gate lines 1 and the data lines 3, the shielding electrodes 7 are provided between the common electrode 5, and the gate lines 1 and the data lines 3, in contrast, common electrodes 5 of the present embodiment are provided in the display regions respectively, and the shielding electrodes 7 and the common electrodes 5 are provided in a same layer.

Specifically, referring to FIGS. 7 and 8, in the array substrate of the present embodiment, each of the common electrodes 5 is provided within one of the display regions 6, the shielding electrodes 7 and the common electrodes 5 are formed of a same material in a same layer. Since each of the common electrodes 5 is provided within one of the display regions 6, the gate lines 1 and the data lines 3 are not covered by the common electrodes 5, and the shielding electrodes 7 cover at least one of the gate lines 1 and/or at least one of the data lines 3, thus patterns of the common electrodes 5 do not interfere with patterns of the shielding electrodes 7, the common electrodes 5 and the shielding electrodes 7 may be formed by a single patterning process, resulting in a simple process.

Correspondingly, in the manufacturing process of the array substrate of the present embodiment, first, the gate lines 1 and the data lines 3 are formed on the base 9, then the pixel electrodes 4 are formed on the gate lines 1 and the data lines 3, and thereafter, the common electrodes 5 and the shielding electrodes 7 are formed simultaneously on the pixel electrodes 4.

Third Embodiment

The present embodiment provides a display apparatus comprising any of the array substrates described as above. The display apparatus of the present embodiment may be any product or part with a display function, such as a liquid crystal display panel, an electronic paper, a mobile phone, a tablet computer, a television, a digital photo frame.

Figure 9:
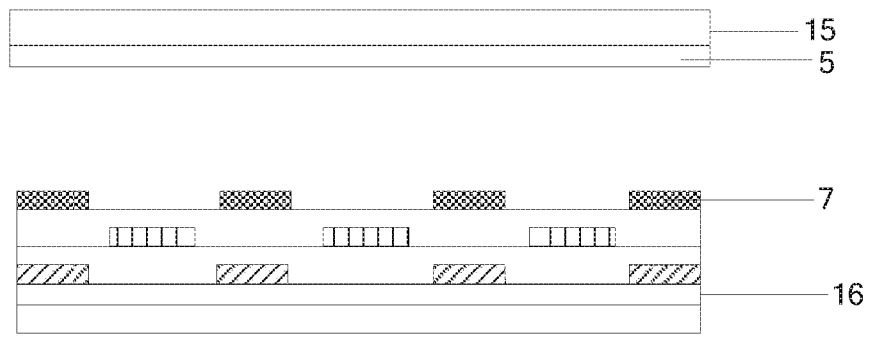
FIG. 9 shows a structural diagram of an improved display apparatus in a third embodiment of the present disclosure.

The structure and the driving mode of the shielding electrodes in the display apparatus of the present embodiment are the same as those in the first and second embodiments, referring to FIG. 9, the present embodiment is distinguished from the first and second embodiments in that, the common electrode 5 in the first and second embodiments is provided in the array substrate, in contrast, the common electrode 5 of the present embodiment is provided in the color filter substrate.

Specifically, as shown in FIG. 9, the display apparatus of the present embodiment comprises an array substrate and a color filter substrate which are aligned and assembled into a cell, the color filter substrate comprises a base 15 and the common electrode 5 provided on the base 15, the array substrate comprises the shielding electrodes 7, a liquid crystal layer may be provided between the common electrode 5 and the shielding electrodes 7, and the orthographic projection of the common electrode 5 on the array substrate at least partially overlaps with orthographic projections of the shielding electrodes 7 on the array substrate, that is to say, there is an overlapped region between the common electrode 5 and the shielding electrodes 7.

Optionally, the shielding electrodes 7 and the common electrode 5 are driven by a same driving voltage so that there is no electrical field between the shielding electrodes 7 and the common electrode 5 in the overlapped region between the common electrode 5 and the shielding electrodes 7, the liquid crystal molecules in the overlapped region between the common electrode 5 and the shielding electrodes 7 will not deflect due to the electrical field between the shielding electrodes 7 and the common electrode 5, thus light leakage due to the electrical field between the shielding electrodes 7 and the common electrode 7 is avoided.

It should be understood that, the above embodiments are merely exemplary embodiments for explaining principle of the present disclosure, but the present disclosure is not limited thereto. Various modifications and improvements may be made by those ordinary skilled in the art within the spirit and essence of the present disclosure, these modifications and improvements fall into the protection scope of the present disclosure.

The invention claimed is:

1. An array substrate, comprising a base, and a plurality of gate lines and a plurality of data lines formed on the base, wherein the array substrate further comprises at least one shielding electrode driven independently, and the at least one shielding electrode covers at least one of at least one of the gate lines and at least one of the data lines, wherein the shielding electrode has a width equal to or larger than a width of the gate line, and/or, the shielding electrode has a width equal to or larger than a width of the data line.

2. The array substrate of claim 1, wherein the gate lines and the data lines intersect to define a plurality of display regions, and the at least one shielding electrode includes more than one shielding electrodes, the shielding electrodes cover more than one of the gate lines and more than one of the data lines, the shielding electrodes covering more than one of the gate lines and the shielding electrodes covering more than one of the data lines intersect to define at least one shielding region, and the at least one shielding region covers at least one of the display regions.

3. The array substrate of claim 2, wherein the shielding electrodes covering more than one of the gate lines are arranged at equal intervals, and the shielding electrodes covering more than one of the data lines are arranged at equal intervals.

4. The array substrate of claim 2, further comprising a first driving line for driving the shielding electrodes, and the first driving line is connected to the shielding electrodes covering more than one of the gate lines and the shielding electrodes covering more than one of the data lines.

5. The array substrate of claim 2, further comprising a plurality of second driving lines, and each of the second driving lines is connected to at least one group of the shielding electrodes.

6. The array substrate of claim 5, wherein driving voltages of the second driving lines are different from each other.

7. The array substrate of claim 1, wherein a first insulating layer is provided between the at least one shielding electrode and the gate lines or the data lines.

8. The array substrate of claim 1, further comprising a common electrode covering the gate lines and the data lines, the at least one shielding electrode is provided on a side of the common electrode proximal to the gate lines and the data lines.

9. The array substrate of claim 8, wherein a second insulating layer is provided between the at least one shielding layer and the common electrode.

10. The array substrate of claim 8, further comprising a pixel electrode, the at least one shielding electrode and the pixel electrode are formed of a same material in a same layer.

11. The array substrate of claim 2, further comprising common electrodes provided in the display regions, the shielding electrodes and the common electrodes are formed of a same material in a same layer.

12. The array substrate of claim 1, wherein the shielding electrode is formed of a transparent conductive material.

13. A display apparatus, comprising a color filter substrate and an array substrate of claim 1.

14. The array substrate of claim 13, wherein the color filter substrate comprises a common electrode, an orthographic projection of the common electrode on the array substrate at least partially overlaps with an orthographic projection of the shielding electrode on the array substrate.

15. The display apparatus of claim 14, wherein the common electrode and the shielding electrode are driven by a same driving voltage.

16. A method for manufacturing the array substrate of claim 1, the method comprising steps of:
   forming a plurality of gate lines and a plurality of data lines on a base;
   forming at least one shielding electrode covering at least one of at least one of the gate lines and at least one of the data lines, the at least one shielding electrode being driven independently.

17. The method of claim 16, further comprising a step of:
   forming a first insulating layer between the at least one shielding electrode and the gate lines or the data lines.

18. The method of claim 16, further comprising a step of:
   forming a common electrode covering the gate lines and the data lines, the at least one shielding electrode being provided on a side of the common electrode proximal to the gate lines and the data lines.

19. The method of claim 18, further comprising a step of:
   forming a second insulating layer between the at least one shielding electrode and the common electrode.

* * * * *